(12) United States Patent
Fleming et al.

(10) Patent No.: US 7,687,126 B2
(45) Date of Patent: Mar. 30, 2010

(54) ADHESIVE ARTICLES AND RELEASE LINERS

(75) Inventors: Danny L. Fleming, Stillwater, MN (US); Michael R. Kesti, Minneapolis, MN (US); John A. Nielsen, Woodbury, MN (US); Richard L. Peloquin, Maplewood, MN (US); Frank T. Sher, St. Paul, MN (US); David J. Yarusso, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1183 days.

(21) Appl. No.: 11/209,146

(22) Filed: Aug. 22, 2005

(65) Prior Publication Data

US 2007/0039271 A1    Feb. 22, 2007

(51) Int. Cl.
B32B 33/00 (2006.01)
(52) U.S. Cl. .............. 428/40.1; 428/41.7; 428/41.8; 428/42.1; 428/156; 428/914; 428/202; 428/220; 427/198; 427/208.6; 156/209
(58) Field of Classification Search .............. 428/40, 428/42, 41.8, 144, 148, 200, 202, 214, 156, 428/220, 343, 345, 352, 354, 173, 198, 317.5, 428/355; 427/198–199, 271, 276, 208.6; 156/209; 264/293–294
See application file for complete search history.

(56) References Cited

U.S. PATENT DOCUMENTS

| 4,999,735 | A | | 3/1991 | Wilner | 361/283 |
| 5,141,790 | A | * | 8/1992 | Calhoun et al. | 428/40.4 |
| 5,243,861 | A | | 9/1993 | Kloeck et al. | 73/517 R |
| 5,296,277 | A | | 3/1994 | Wilson et al. | |
| 5,362,516 | A | | 11/1994 | Wilson et al. | |
| 5,367,429 | A | | 11/1994 | Tsuchitani et al. | 361/280 |
| 5,461,917 | A | | 10/1995 | Marek et al. | 73/514.16 |
| 5,484,073 | A | | 1/1996 | Erickson | 216/2 |
| 5,551,294 | A | | 9/1996 | Hermann | 73/514.32 |
| 5,652,384 | A | | 7/1997 | Henrion et al. | 73/514.24 |
| 5,897,930 | A | * | 4/1999 | Calhoun et al. | 428/41.8 |
| 6,197,397 | B1 | | 3/2001 | Sher et al. | |

FOREIGN PATENT DOCUMENTS

DE    4032828 A1    4/1991

(Continued)

Primary Examiner—Jeanette Chapman
(74) Attorney, Agent, or Firm—Colene H. Blank

(57) ABSTRACT

The present application is directed to adhesive articles and release liners. Namely, the present application is directed to an article comprising an adhesive layer with a structured surface. The structured surface comprises a first groove and a second groove recessed into the adhesive layer from a reference plane defined by the adhesive surface on either rim of the groove. In some embodiments, the second groove is contained within the first groove, and in other embodiments the grooves are separate. The first groove and the second groove have walls. The wall angle of the first groove with respect to the reference plane is non-zero and is smaller than the wall angle of the second groove with respect to the reference plane. The application is also directed to release liners for the adhesive article, wherein the surface of the release liner is the inverse of the adhesive surface.

18 Claims, 3 Drawing Sheets

FOREIGN PATENT DOCUMENTS

| | | |
|---|---|---|
| DE | 4132232 A1 | 4/1993 |
| DE | 4222472 A1 | 1/1994 |
| JP | 51-45137 | 4/1976 |
| JP | 07-138541 | 5/1995 |
| WO | WO 98/29231 | 7/1998 |
| WO | WO 99/24519 | 5/1999 |
| WO | WO 00/69985 | 11/2000 |

\* cited by examiner

ADHESIVE ARTICLES AND RELEASE LINERS

FIELD

The present application is directed to adhesive articles and release liners.

BACKGROUND

Pressure sensitive adhesives are useful for the joining of two materials. The interfaces between the adhesive and the materials are vital to the performance of the joined materials. Adhesives have been structured in the past for various reasons.

Several approaches to structuring adhesives are known, including those shown in, for example, U.S. Pat. Nos. 5,296,277 and 5,362,516 (both Wilson et al.); U.S. Pat. Nos. 5,141,790 and 5,897,930 (both Calhoun et al.); and U.S. Pat. Nos. 6,197,397 (Sher et. al). These patents disclose how the structure in the adhesive is built from the interface between the adhesive and the release liner.

Known release liners are generally manufactured by structuring a thermoplastic polymer surface of the liner. Current methods of making release liners having microstructured patterns include cast extrusion onto a microstructured tool that imparts the desired pattern to the liner followed by silicone release coating where required, or by pressing a pattern into a thermoplastic polymer surface, with or without a silicone release coating, between structured nips to impart a pattern. These manufacturing steps form the topography on the liner, which is then used to impart topography into an adhesive.

SUMMARY

Figure 1A:
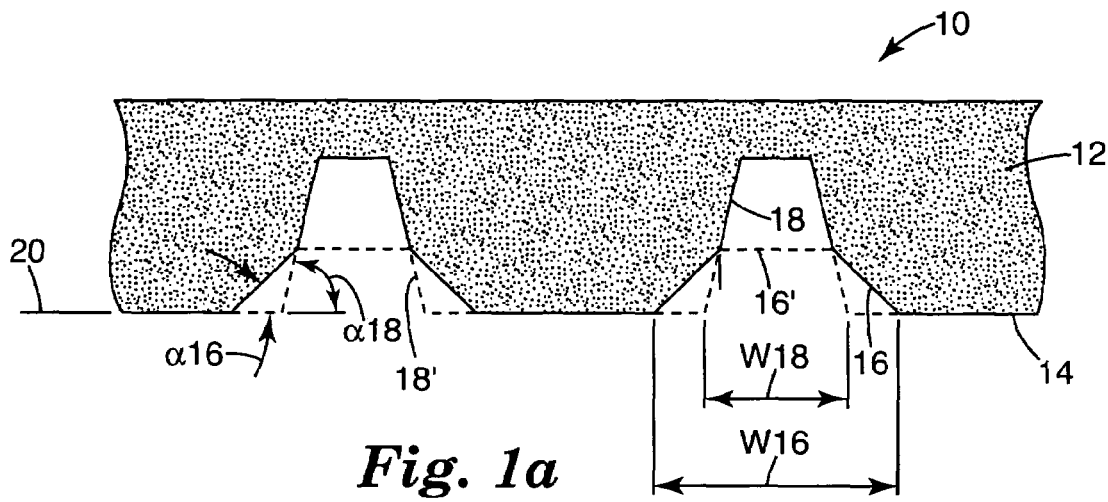
FIG. 1a is a cross sectional view of a first embodiment of the present invention.

The present application is directed to an article comprising an adhesive layer with a structured surface. The structured surface comprises a first groove and a second groove recessed into the adhesive layer from a reference plane defined by the adhesive surface on either rim of the groove. The second groove is contained within the first groove, and the first groove and the second groove have walls. The wall angle of the first groove with respect to the reference plane is non-zero and is smaller than the wall angle of the second groove with respect to the reference plane. The application is also directed to release liners for the adhesive article, wherein the surface of the release liner is the inverse of the adhesive surface.

The present application is also directed to an article comprising an adhesive layer with a structured surface. The structured surface comprises a first groove and a second groove recessed into the adhesive layer from a reference plane defined by the adhesive surface on either rim of the groove. The first groove and the second groove have substantially symmetric walls that each meet the reference plane at an angle, and the wall angle of the first groove is smaller than the wall angle of the second groove. The application is also directed to release liners for the adhesive article, wherein the surface of the release liner is the inverse of the adhesive surface.

The present application also discloses a method of adhering an adhesive to a substrate, comprising placing a first major surface of an adhesive layer in contact with a substrate. The adhesive layer comprises a structured surface on the first major surface, the structured surface comprising a first groove and a second groove recessed into the adhesive layer from a reference plane defined by the adhesive surface on either rim of the groove, and the wall angle of the first groove with respect to the reference plane is smaller than the wall angle of the second groove with respect to the reference plane. Additionally, the adhesive deforms such that a major portion of the walls of the first groove contacts the substrate while a major portion of the walls of the second groove does not contact the substrate.

DETAILED DESCRIPTION

The present application is directed to adhesive articles and release liners. The adhesive articles generally comprise an adhesive layer. In many embodiments, the adhesive layer is on one surface of a backing. Additionally, the article may include a release liner on the adhesive surface opposite the backing.

The adhesive may be any type of adhesive. For example, the adhesive may be a film adhesive, such as a cling film, a heat activated adhesive or a pressure sensitive adhesive.

The adhesive comprises a structured surface on one major surface of the adhesive. The structured surface comprises at least two grooves recessed into the adhesive from a plane defined by the adhesive surface on either rim of the groove. For the purpose of the present application, this plane is the reference plane. In some embodiments, the reference plane is the same plane for all the grooves on the adhesive surface. In other embodiments, the reference plane is defined by each groove individually, as the adhesive surface itself may not be completely planar. The grooves may have any geometrical cross-sectional shape. For example, the grooves may be trapezoidal, triangular or rectangular.

The grooves have walls. The walls have an angle within the groove relative to the reference plane, referred to as the wall angle. The wall angle is shown further in the Figures. The wall angle of the first groove is smaller than the wall angle of the second groove. In some embodiments, the walls meet the reference plane of the adhesive surface. In other embodiments, the walls do not meet the plane, but are interrupted. For example, in some embodiments, the second groove is contained within the first groove. When the second groove is contained within the first groove, the second groove has a width at the reference plane smaller than the width of the first groove at the reference plane, and the width of the second groove is encompassed by the width of the first groove. However, in such an embodiment, the walls comprise real walls that are extended to the reference plane with virtual walls. In other words, the real walls of the first groove end where they intersect the steeper sloping real walls of the second groove, and the second groove walls continue further into the adhesive.

The wall angle for the first groove is non-zero, and is generally about 15 to about 89 degrees smaller than the wall angle for the second groove, for example about 20 to about 85 degrees smaller. In some embodiments, the first groove has a wall angle of about 1 to about 75 degrees, for example between about 3 and about 45 degrees. In some embodiments, the wall angle of the first groove is between about 5 and about 30 degrees, for example 10 to 6 degrees. In some embodiments, the second groove has a wall angle of about 20 to about 90 degrees, for example between about 25 and about 90 degrees. In some embodiments, the second groove has a wall angle of about 30 to about 80 degrees. The angles are discussed as though sharp angles exist with the reference plane. However, the present application encompasses embodiments with rounded corners and curved surfaces at the locations where the groove walls meet the groove rim or the deepest part of the groove, or where the real wall of the second groove meets the real wall of the first groove. The radius of curvature for these curved surfaces can vary. Additionally, the real walls themselves may not be completely straight in cross section, but may have some curvature, so long as the first groove and the second groove are measurably distinct. For the purpose of the present invention, the wall angle is then determined by a best-fit line.

In some embodiments, the grooves have substantially symmetric walls. For the purpose of the present application, substantially symmetric means that the wall angle of opposite walls within a groove vary no more than about 10° for example no more than 5°.

In some embodiments, the grooves are repeated with a regular repeat distance between similar groove types called the pitch. The geometrical configuration is chosen such that the pitch (that is, center to center distance between similar groove types) is generally greater than about 150 micrometers, for example greater than about 170 micrometers and in specific embodiments, greater than about 200 micrometers. In some embodiments, the pitch may be greater than about 400 micrometers.

The pitch for the first groove type may be different from the pitch for the second groove type. The groove pitch may be uniform, but it is not always necessary or desirable for the pitch to be uniform. It is recognized that in some embodiments of the invention, it may not be necessary, or desirable, that uniform pitch be observed, nor that all grooves be identical.

The grooves may have a depth from the reference plane of greater than about 3 micrometers, for example greater than about 5 micrometers and in specific embodiments greater than about 7 micrometers. In some embodiments, the groove depth is less than about 75 micrometers, for example less than 45 micrometers and in specific embodiments less than about 35 micrometers. The groove depth may be less than 25 micrometers. The groove depth may be uniform, but it is not always necessary or desirable for the depth to be uniform. It is recognized that in some embodiments of the invention, it may not be necessary, or desirable, that uniform depth be observed, nor that all grooves be identical. In some embodiments, the depth of the second groove is larger than the depth of the first groove, for example in some embodiments where the second groove is contained within the first groove. In certain embodiments, the depth of one or both of the groove types is the same as the thickness of the adhesive layer, resulting in a segmented, or discontinuous adhesive. In other embodiments, the groove depth is less than the thickness of the adhesive layer, and the adhesive is continuous.

In the embodiment where the second groove is contained within the first groove, the depth of the first groove will be defined by the deepest point reached by a real wall of the first groove.

The grooves may have a width at the reference plane of less than about 300 micrometers, for example less than about 200 micrometers and in specific embodiments less than about 150 micrometers. The grooves may have a width at the reference plane of greater than about 15 micrometers, for example greater than about 25 micrometers and in specific embodiments greater than about 50 micrometers. The width at the reference plane may be the distance between the points at the reference plane where the virtual lines that continue a groove meet the reference plane, such as is described in FIG. 1, where the second groove is contained within the first groove. Generally, the width of the first groove at the reference plane is at least about 120% of the width of the second groove at the reference plane. In some embodiments, the width of the first groove is at least 150% of the width of the second groove, in certain embodiments, at least 200%.

The grooves also may have a width at the deepest part of the groove. This width may be between 0 and about 100 micrometers, in certain embodiments between 6 and 55 micrometers, for example between about 10 to about 45 micrometers.

The groove width may be uniform for all grooves and along the length of the groove, but it is not always necessary or desirable for the width to be uniform. It is recognized that in some embodiments of the invention, it may not be necessary, or desirable, that uniform width be observed, nor that all grooves be identical.

The grooves may be arranged in a pattern that is regular, random, or a combination of the two. "Regular" means that the pattern of grooves is planned and reproducible. "Random" means the pattern of grooves is varied in a non-regular manner. Combination patterns may comprise patterns that are random over an area, but these random patterns can be reproduced over larger distances within the overall pattern.

The area of the grooves in the reference plane can be defined by the length of the grooves and the width of the grooves that actually meet the reference plane (e.g. the real groove walls, as opposed to virtual walls discussed herein). The groove area fraction (i.e. the area of the grooves per unit area of reference plane) may range from about 1% to about 100%, for example between 5% and about 95% and in some embodiments between 30% and 70%. In certain embodiments, if the width of the grooves at the reference plane is equal to the pitch, the grooves meet adjacent grooves at a line or a point, and the groove area fraction is essentially 100%.

For the purpose of the present application, the reference plane is discussed as if it were strictly planar over the entire article. However, as discussed above, the reference plane may be nearly planar or may be locally planar or nearly planar in the vicinity of a groove.

In some embodiments, the adhesive article may include an additional structure on the structured surface, superimposed on the structure described herein. Examples of these additional structures can be found, for example, in U.S. Pat. No. 5,141,790. The additional structure may include adhesive or non-adhesive protrusions on the structured adhesive surface, for example projecting out of the reference plane or projecting out of the real walls of the adhesive.

Generally, the article includes a release liner on one surface of the adhesive. In many embodiments, the release liner is structured, and the structure on the release liner is the inverse of the structure on the adhesive. For example, for every groove in the adhesive, the release liner has a corresponding ridge. The ridges protrude from a liner reference plane, which is defined by the liner surface at the base of each ridge. The dimensions of each ridge correspond to the desired dimensions of each groove in the adhesive. For example, the groove width at the reference plane corresponds to the ridge width at the liner reference plane. In embodiments comprising a protrusion from the reference plane or from the real walls on the adhesive structured surface, the release liner will comprise a corresponding depression. The structure on the release liner can be created in a number of known ways, including embossing the liner to form a structured surface or printing a structure on the surface.

The structured adhesive layer may be created by contacting an adhesive with the structured surface of the release liner, forming an adhesive article. The adhesive may contact the structured surface by, for example, coating a composition (e.g. an adhesive composition in solution, a composition as a dispersion or a hot melt composition) or laminating an existing adhesive layer. In embodiments where the liner was coated with a release coating, the adhesive layer exists over any release coating. The structure on the release liner imparts a structure into one major surface of the adhesive layer.

Any material suitable as a release liner base material would be suitable for the release liner of the present invention. Examples include silicone coated materials such as papers and polymeric films, including plastics. The liner base material may be single or multiple layer. Specific examples include, polyester (for example polyethylene terephthalate), polyethylene, polypropylene (including cast and biaxially oriented polypropylene), and papers (including clay coated paper). In some embodiments, the liner is a polyethylene coated paper or a polyethylene coated poly(ethylene terephthalate) film.

Generally, the structured surface of the adhesive is opposite a backing. The backing can be any material, depending on the intended use of the adhesive article. For example, in embodiments where the adhesive article is used for a large format graphic (e.g. over 32 inches wide), the backing may be a material suitable for receiving an image (e.g. a vinyl or a polyolefin with an ink receptor layer opposite the adhesive layer).

Figure 1B:
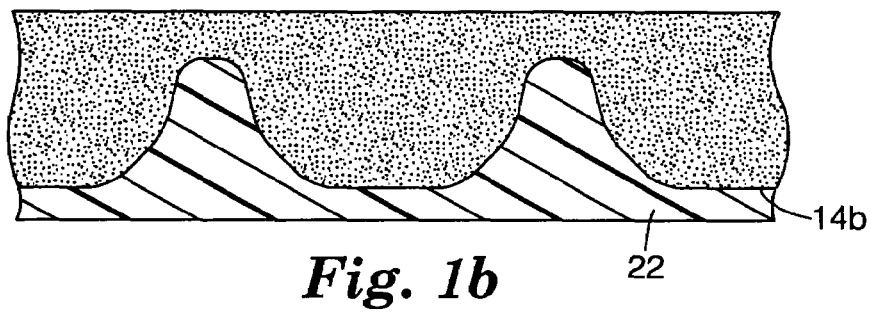
FIG. 1b is a cross sectional view of a second embodiment of the present invention.

FIG. 1a illustrates a first embodiment of the present application. FIG. 1a shows adhesive article 10, comprising an adhesive layer 12. The adhesive layer 12 has a structured surface 14. In some embodiments, adhesive article 10 would comprise a release liner on structured surface 14 and a backing opposite the release liner (not shown). Structured surface 14 comprises a first groove 16 and a second groove 18. The first groove has a virtual surface 16' and the second groove has virtual walls 18'. The second groove 18 is contained within the first groove 16. The surfaces of the structured surface on either edge of the grooves define a reference plane 20. The walls of the first groove 16 have an angle with respect to the reference plane $\alpha_{16}$. The walls of the second groove 18 have an angle with respect to the reference plane $\alpha_{18}$. FIG. 1 shows an embodiment wherein the walls of the second groove 18 are virtual at the point they meet the reference plane 20. Angle $\alpha_{18}$ is larger than angle $\alpha_{16}$. The grooves in FIG. 1a have a width at the reference plane of $w_{16}$ and $w_{18}$. FIG. 1b shows a second embodiment, which is a modification of the embodiment shown in FIG. 1a, wherein the corners of the grooves are rounded. Release liner 22 is shown in FIG. 1b on the structured surface 14b of the adhesive.

Figure 2A:
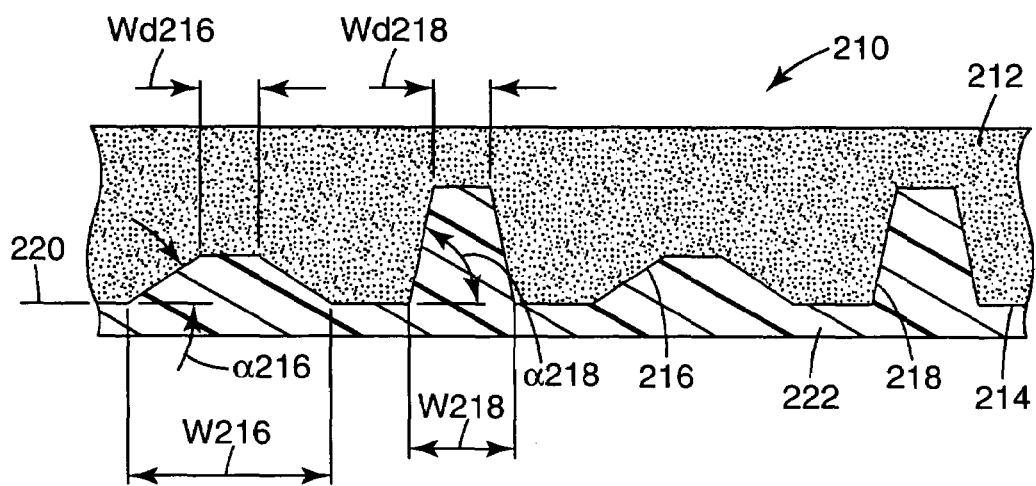
FIG. 2a is a cross sectional view of a third embodiment of the present invention.
Figure 2B:
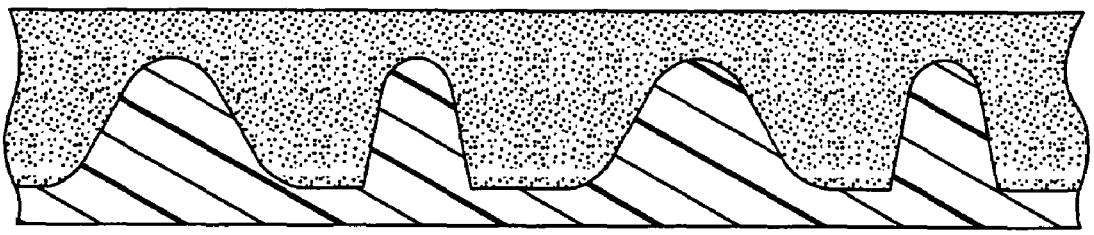
FIG. 2b is a cross sectional view of a fourth embodiment of the present invention.

FIG. 2a shows a third embodiment of the present application wherein the walls of the second groove meet the reference plane. FIG. 2a shows adhesive article 210, comprising an adhesive layer 212 and a release liner 222. The adhesive layer 212 has a structured surface 214. Structured surface 214 comprises a first groove 216 and a second groove 218. The surface of the structured surface on either edge of the grooves define a reference plane 220. The walls of the first groove 216 have an angle with respect to the reference plane $\alpha_{216}$. The walls of the second groove 218 have an angle with respect to the reference plane $\alpha_{218}$. Angle $\alpha_{218}$ is larger than angle $\alpha_{216}$. The grooves in FIG. 2a have a width at the reference plane of $w_{216}$ and $w_{218}$. Additionally, the grooves in FIG. 2a have a width at the deepest point of $w_{d216}$ and $w_{d218}$. FIG. 2b shows a fourth embodiment, which is a modification of the embodiment shown in FIG. 2a, wherein the corners of the grooves are rounded and the depths of the grooves are closer to equal.

Figure 3:
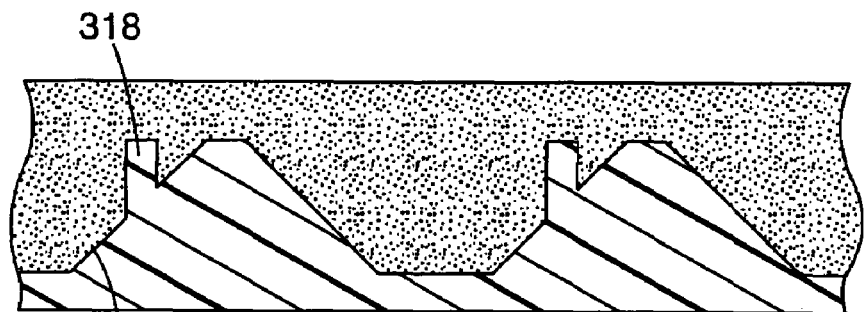
FIG. 3 is a cross sectional view of a fifth embodiment of the present invention.

FIG. 3 shows a fifth embodiment of the present invention. In FIG. 3, second groove 318 is contained within first groove 316. However, as opposed to the embodiment represented in FIG. 1, the second groove 318 is closer to one rim of the first groove 316, and is not centered at the same point.

Figure 4:
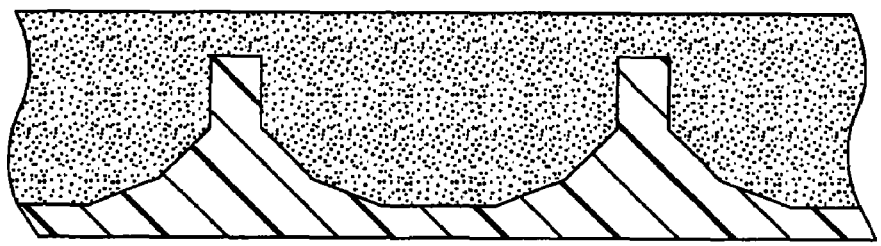
FIG. 4 is a cross sectional view of a sixth embodiment of the present invention.
Figure 5:
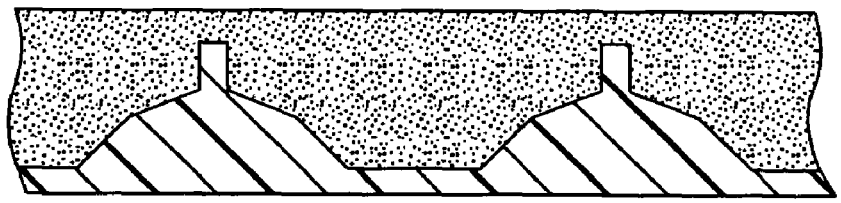
FIG. 5 is a cross sectional view of a seventh embodiment of the present invention.

FIGS. 4 and 5 show embodiments wherein more than two grooves exist, namely each embodiment shows three grooves, all contained within each other.

Figure 6:
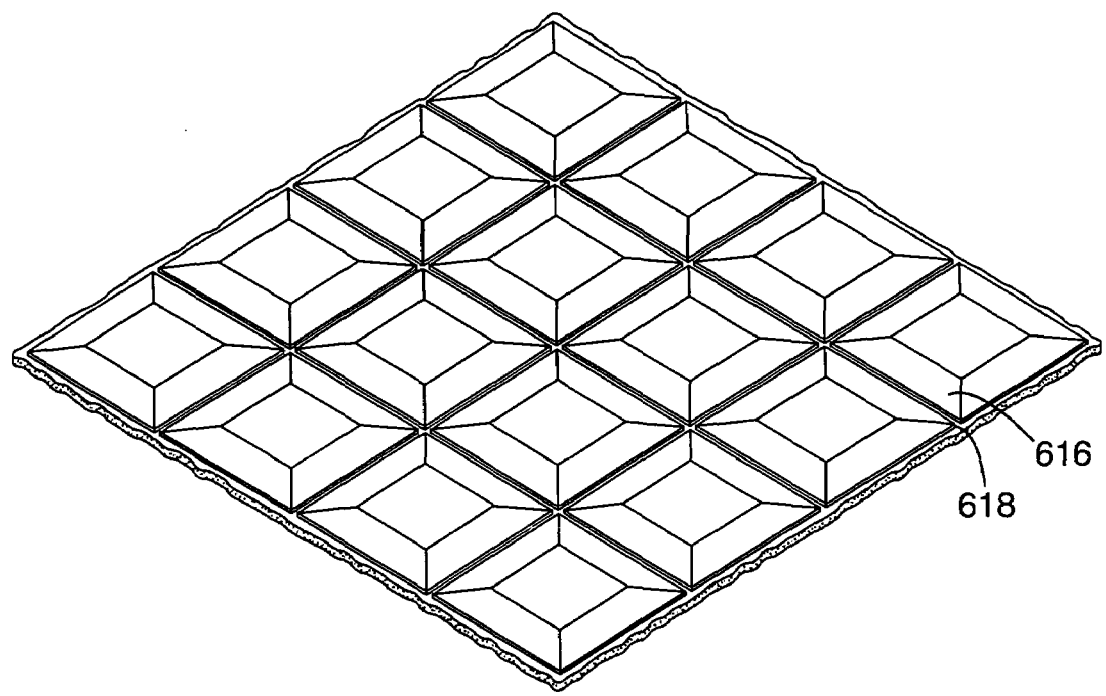
FIG. 6 is an elevated view of an embodiment of the present invention.
Figure 7A:
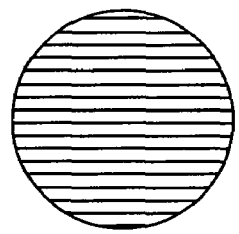
FIGS. 7a-7d are representative figures of patterns of the grooves in the present adhesive articles.
Figure 7B:
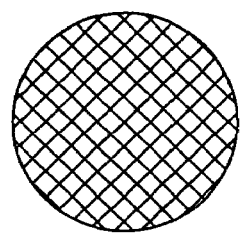
Figure 7C:
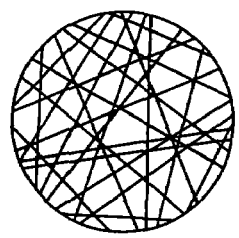
Figure 7D:
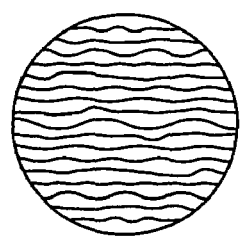

FIG. 6 shows an elevated view of an adhesive article of the present invention, after the release liner has been removed. The embodiment in FIG. 6 is similar to the embodiment of FIG. 1, in that the second groove 618 is contained within the first groove 616 and the grooves are repeated in a grid pattern.

FIGS. 7a through 7d show representations of the patterns formed by the grooves on the adhesive surface. The patterns of the grooves may be intersecting or parallel. The pattern may have alternating first and second groove types or intersecting first and second groove types.

In many embodiments, the structure in the adhesive forms air egress channels in a pressure sensitive adhesive. For example, upon removal from the release liner, the adhesive has a structured pattern the inverse of the structured pattern formed on the release liner, and when the structured surface of the adhesive is applied to a substrate, the grooves define exit pathways for air to bleed out from under the adhesive layer when the structured surface of the adhesive is adhered to a substrate. In such embodiments, the grooves exist in a continuous form to at least one edge of the adhesive article.

In the present application, the adhesive article may be used in a method of adhering an adhesive to a substrate. In such an embodiment, the structured surface of the adhesive is applied to a bonding substrate. The structured surface of the adhesive layer deforms such that a major portion of the real walls of the first groove contacts the substrate while a major portion of the real walls of the second groove does not contact the substrate. For the purpose of the present application, a major portion of the walls has contacted the bonding substrate when more than 50% of the adhesive surface comprising the groove wall has contacted the bonding substrate.

The adhesive article can be applied to a bonding substrate using additional tools, such as temperature elevation, pressure application, and aging of the adhesive to allow flow. In some embodiments, after the major portion of the first groove is in contact with the substrate, a major portion of the walls of the second groove contacts the substrate.

The following examples further disclose embodiments of the invention.

EXAMPLES

The topography of structured materials was evaluated using light microscopy with a JENA JENAVERT (Jena, Germany) incident light microscope or interferometry microscopy using a WYKO Optical Profiler (available from WYKO Corp., Tucson Ariz.). The adhesive wetout analysis used the incident light microscope.

Example 1

Acrylic pressure sensitive adhesive (PSA) compositions were coated onto a structured surface of a release liner. The structured surface of the release liner had a thin layer of silicone release coating. The liners coated with adhesive were then oven dried for solvent-coated formulations. A white plasticized, flexible PVC backing film 2 mil thick (50 micrometers) was laminated onto the exposed PSA layer. The PSA compositions were characterized by known methods of dynamic mechanical analysis and the construction of master curves. The magnitudes of the complex shear modulus, |G*| (Pascals), at various frequencies at a reference temperature of 25° C. for the PSA compositions used are shown in the following table:

| |G*| (Pa) | Frequency (Hz) | | | |
|---|---|---|---|---|
| Adhesive | $2.65 \times 10^{-2}$ | $2.65 \times 10^{-3}$ | $2.65 \times 10^{-4}$ | $2.65 \times 10^{-5}$ |
| A | $1.59 \times 10^4$ | $6.38 \times 10^3$ | $3.02 \times 10^3$ | $1.92 \times 10^3$ |
| B | $1.95 \times 10^4$ | $1.28 \times 10^4$ | $8.77 \times 10^3$ | $6.40 \times 10^3$ |
| C | $2.72 \times 10^4$ | $1.65 \times 10^4$ | $1.09 \times 10^4$ | $8.28 \times 10^3$ |
| D | $4.89 \times 10^4$ | $3.17 \times 10^4$ | $2.07 \times 10^4$ | $1.48 \times 10^4$ |

The structured surface of each release liner had two sets of protruding ridges. One set was a pattern of first continuous ridges. The second set was a pattern of second continuous ridges. Each set of continuous ridges made a repeat pattern of parallel linear ridges in the downweb coating direction of the liner. The second set of ridges was contained in the first set such that one downweb continuous second ridge protruded from every downweb continuous first ridge, and each of the two sloping walls of the first ridge ended where the steeper sloping wall of the second ridge protruded. The first ridges had a center to center repeat pitch of 340 micrometers, a width at the reference plane of the liner of 159 microns, wall slopes from the reference plane of the liner of 10 degrees, and a height up to the protruding portion of the second ridge of about 13 microns. The second ridge was centered over the first ridge. The second ridge had the same repeat pitch as the first ridge, a nominal height from the reference plane of the liner of about 20 microns, wall slopes from the reference plane of the liner of about 80 degrees, and a flat top of about 12 microns wide. The liner also had an additional structure of small recessed pits filled with ceramic beads.

The liner was peeled from a small sample to expose the adhesive layer having corresponding grooves. A clear acrylic plate was placed onto the pan of an electronic balance, the balance was zeroed, and the adhesive face of the film sample was lightly placed onto the plate. Gentle pressure was applied with a back-and-forth movement of an index finger to register about 500 g on the balance and to adhere the adhesive layer to the plate. The width opening of grooves at the plate surface was determined and the range of percent groove wall that had wetout onto the plate was calculated for the sample after dwell conditions of A: 24 hours at ambient room temperature, B: then an additional 6 days at 22 C/50% relative humidity dwell, and C: finally, an additional 24 hours in a 66 C oven.

| Adhesive | Dwell Condition | % of Real Wall of First Groove that Contacted Panel | % of Real Wall of Second Groove that Contacted Panel |
|---|---|---|---|
| A | B | 65%-85% | 0% |
| A | C | 83%-89% | 0% |
| B | A | 47%-68% | 0% |
| B | B | 45%-74% | 0% |
| B | C | 72%-87% | 0% |
| C | B | 51%-80% | 0% |
| C | C | 55%-81% | 0% |
| D | C | 49%-66% | 0% |

Example 2

Example 1 was repeated, but used a release liner having ridge structures that formed a different pattern and a comparative release liner that had only one set of ridges. The example used adhesive A.

The ridge structures were similar to those of Example 1, except each of the first set and second set of ridges repeated in two subsets of intersecting linear parallel patterns making a square grid pattern on the liner. The second set of ridges were aligned in registration with the first set of ridges and protruded from the first set of ridges. The first ridges had a center to center repeat pitch of 292 micrometers, wall slopes from the reference plane of the liner of 10 degrees, and a height up to the protruding portion of the second ridge of about 10 microns. The second ridge was centered over the first ridge. The second ridges had the same repeat pitch as the first ridges, a nominal height from the reference plane of the liner of about 20 microns, and wall slopes from the reference plane of the liner of about 80 degrees, and a flat top of about 12 microns wide.

A comparative liner had a similar grid structure, but used only the first set of ridges. The ridges had 10 degree wall slopes, a greater height of about 25 microns, and a flat top width of about 6 microns. There were no second set of ridges.

The samples applied to the acrylic panel were subjected to dwell condition C. On average, the real walls of the first set of grooves in the adhesive had essentially completely wetout on the panel, while the real walls of the second set of grooves did not. Most of the second set of grooves remained open. The comparative sample showed many regions of localized sealing of the grooves.

Various modifications and alterations of the present invention will become apparent to those skilled in the art without departing from the spirit and scope of the invention.

What is claimed is:

1. An article comprising an adhesive layer; a structured surface on a first major surface of the adhesive layer, the structured surface comprising a first groove and a second groove recessed into the adhesive layer from a reference plane defined by the adhesive surface on either rim of the groove, wherein the second groove is contained within the first groove, and the first groove and the second groove have walls, and the wall angle of the first groove with respect to the reference plane is non-zero and is smaller than the wall angle of the second groove with respect to the reference plane.

2. The article of claim 1 wherein a real wall of the second groove intersects a real wall of the first groove.

3. The article of claim 1 wherein the width of the first groove at the reference plane is at least 120% of the width of the second groove at the reference plane.

4. The article of claim 1, wherein the depth of the second groove from the reference plane is greater than the depth of the first groove.

5. The article of claim 1, wherein the wall angle of the first groove is at least 15 degrees less than the wall angle of the second groove.

6. The article of claim 1, wherein the first groove is continuous to at least one edge of the article.

7. The article of claim 1, wherein the grooves repeat in an intersecting pattern.

8. The article of claim 1, wherein the grooves repeat in a parallel pattern.

9. The article of claim 1, wherein the groove area fraction ranges from about 5% to about 95%.

10. The article of claim 1 comprising protrusions from the adhesive surface.

11. An article comprising an adhesive layer; a structured surface on a first major surface of the adhesive layer, the structured surface comprising a first groove and a second groove recessed into the adhesive layer from a reference plane defined by the adhesive surface on either rim of the groove, wherein the first groove and the second groove have substantially symmetric walls that each meet the reference plane at an angle, and the wall angle of the first groove is smaller than the wall angle of the second groove.

12. The article of claim 11, wherein the wall angle of the first groove is at least 15 degrees less than the wall angle of the second groove.

13. The article of claim 11, wherein the width of the first groove is greater than the width of the second groove.

14. The article of claim 11, wherein the groove area fraction ranges from about 5% to about 95%.

15. The article of claim 11, wherein the grooves repeat in an intersecting pattern.

16. The article of claim 11, wherein the grooves repeat in a parallel pattern.

17. The article of claim 11 comprising protrusions from the adhesive surface.

18. The article of claim 1, wherein the second groove is closer to one rim of the first groove than to the second rim.

* * * * *